(12) United States Patent
Yednak, III et al.

(10) Patent No.: US 9,341,296 B2
(45) Date of Patent: May 17, 2016

(54) HEATER JACKET FOR A FLUID LINE

(75) Inventors: Andrew M. Yednak, III, Phoenix, AZ (US); Frederick L. Pettinger, Jr., Phoenix, AZ (US)

(73) Assignee: ASM America, Inc., Phoenix, AZ (US)

( * ) Notice: Subject to any disclaimer, the term of this patent is extended or adjusted under 35 U.S.C. 154(b) by 672 days.

(21) Appl. No.: 13/283,408

(22) Filed: Oct. 27, 2011

(65) Prior Publication Data

US 2013/0104988 A1 May 2, 2013

(51) Int. Cl.
| | |
|---|---|
| F24F 11/053 | (2006.01) |
| E03B 1/00 | (2006.01) |
| F16K 49/00 | (2006.01) |
| E03B 7/10 | (2006.01) |
| F16L 53/00 | (2006.01) |

(52) U.S. Cl.
CPC .......... *F16L 53/008* (2013.01); *Y10T 137/0318* (2015.04); *Y10T 137/6416* (2015.04)

(58) Field of Classification Search
CPC ............ F16L 53/008; Y10T 137/0318; Y10T 137/6416
USPC ........................... 236/1 C; 137/1, 334; 138/33
See application file for complete search history.

(56) References Cited

U.S. PATENT DOCUMENTS

| | | | |
|---|---|---|---|
| 2,745,640 A * | 5/1956 | Cushman | 165/299 |
| 2,990,045 A * | 6/1961 | Root | 192/82 T |
| 3,833,492 A | 9/1974 | Bollyky | |
| 3,854,443 A | 12/1974 | Baerg | |
| 3,862,397 A | 1/1975 | Anderson et al. | |
| 3,887,790 A * | 6/1975 | Ferguson | 219/535 |
| 4,054,071 A * | 10/1977 | Patejak | 83/306 |
| 4,058,430 A | 11/1977 | Suntola et al. | |
| 4,145,699 A | 3/1979 | Hu et al. | |
| 4,176,630 A * | 12/1979 | Elmer | 123/41.12 |
| 4,181,330 A * | 1/1980 | Kojima | 285/179.1 |
| 4,194,536 A * | 3/1980 | Stine et al. | 138/149 |
| 4,322,592 A | 3/1982 | Martin | |
| 4,389,973 A | 6/1983 | Suntola et al. | |
| 4,393,013 A | 7/1983 | McMenamin | |
| 4,436,674 A | 3/1984 | McMenamin | |
| 4,499,354 A | 2/1985 | Hill et al. | |
| 4,512,113 A | 4/1985 | Budinger | |
| 4,570,328 A | 2/1986 | Price et al. | |
| D288,556 S | 3/1987 | Wallgren | |
| 4,653,541 A * | 3/1987 | Oehlschlaeger et al. | 138/104 |
| 4,722,298 A | 2/1988 | Rubin et al. | |

(Continued)

FOREIGN PATENT DOCUMENTS

| | | |
|---|---|---|
| CN | 1563483 A | 12/2006 |
| CN | 101330015 | 12/2008 |

(Continued)

OTHER PUBLICATIONS

USPTO; Final Office Action dated Jun. 28, 2013 in U.S. Appl. No. 12/754,223.

(Continued)

*Primary Examiner* — Henry Crenshaw
(74) *Attorney, Agent, or Firm* — Snell & Wilmer LLP

(57) ABSTRACT

A heater jacket for a fluid line including a tube having an inner surface and an outer surface; a spacer disposed within the tube between the inner surface and the fluid line; and wherein the spacer includes a hole for receiving the fluid line therein and spaces the fluid line from the tube inner surface.

24 Claims, 4 Drawing Sheets

(56) References Cited

U.S. PATENT DOCUMENTS

| | | | |
|---|---|---|---|
| 4,735,259 A * | 4/1988 | Vincent | 165/47 |
| 4,753,192 A | 6/1988 | Goldsmith et al. | |
| 4,789,294 A | 12/1988 | Sato et al. | |
| 4,821,674 A | 4/1989 | deBoer et al. | |
| 4,827,430 A | 5/1989 | Aid et al. | |
| 4,882,199 A | 11/1989 | Sadoway et al. | |
| 4,986,215 A | 1/1991 | Yamada | |
| 4,991,614 A * | 2/1991 | Hammel | 137/13 |
| 5,074,017 A | 12/1991 | Toya et al. | |
| 5,119,760 A | 6/1992 | McMillan et al. | |
| 5,167,716 A | 12/1992 | Boitnott et al. | |
| 5,199,603 A | 4/1993 | Prescott | |
| 5,221,556 A | 6/1993 | Hawkins et al. | |
| 5,242,539 A | 9/1993 | Kumihashi et al. | |
| 5,243,195 A | 9/1993 | Nishi | |
| 5,326,427 A | 7/1994 | Jerbic | |
| 5,380,367 A | 1/1995 | Bertone | |
| 5,421,893 A | 6/1995 | Perlov | |
| 5,422,139 A | 6/1995 | Fischer | |
| 5,518,549 A | 5/1996 | Hellwig | |
| 5,595,606 A | 1/1997 | Fujikawa et al. | |
| 5,616,947 A | 4/1997 | Tamura | |
| 5,632,919 A | 5/1997 | MacCracken et al. | |
| 5,681,779 A | 10/1997 | Pasch et al. | |
| 5,695,567 A | 12/1997 | Kordina | |
| 5,730,801 A | 3/1998 | Tepman | |
| 5,732,744 A | 3/1998 | Barr et al. | |
| 5,736,314 A * | 4/1998 | Hayes et al. | 435/4 |
| 5,796,074 A | 8/1998 | Edelstein et al. | |
| 5,836,483 A | 11/1998 | Disel | |
| 5,837,320 A | 11/1998 | Hampden-Smith et al. | |
| 5,855,680 A | 1/1999 | Soininen et al. | |
| 5,920,798 A | 7/1999 | Higuchi et al. | |
| 5,979,506 A * | 11/1999 | Aarseth | 138/33 |
| 6,013,553 A | 1/2000 | Wallace | |
| 6,015,465 A | 1/2000 | Kholodenko et al. | |
| 6,035,101 A | 3/2000 | Sajoto et al. | |
| 6,060,691 A | 5/2000 | Minami et al. | |
| 6,074,443 A | 6/2000 | Venkatesh | |
| 6,083,321 A | 7/2000 | Lei et al. | |
| 6,086,677 A | 7/2000 | Umotoy et al. | |
| 6,122,036 A | 9/2000 | Yamasaki et al. | |
| 6,125,789 A | 10/2000 | Gupta et al. | |
| 6,129,044 A | 10/2000 | Zhao et al. | |
| 6,148,761 A | 11/2000 | Majewski et al. | |
| 6,160,244 A | 12/2000 | Ohashi | |
| 6,161,500 A | 12/2000 | Kopacz et al. | |
| 6,201,999 B1 | 3/2001 | Jevtic | |
| 6,274,878 B1 | 8/2001 | Li et al. | |
| 6,287,965 B1 | 9/2001 | Kang et al. | |
| 6,302,964 B1 | 10/2001 | Umotoy et al. | |
| 6,312,525 B1 | 11/2001 | Bright et al. | |
| D451,893 S | 12/2001 | Robson | |
| D452,220 S | 12/2001 | Robson | |
| 6,326,597 B1 | 12/2001 | Lubomirsky et al. | |
| 6,342,427 B1 | 1/2002 | Choi et al. | |
| 6,367,410 B1 | 4/2002 | Leahey et al. | |
| 6,368,987 B1 | 4/2002 | Kopacz et al. | |
| 6,383,566 B1 | 5/2002 | Zagdoun | |
| 6,410,459 B2 | 6/2002 | Blalock et al. | |
| 6,420,279 B1 | 7/2002 | Ono et al. | |
| 6,454,860 B2 | 9/2002 | Metzner et al. | |
| 6,478,872 B1 | 11/2002 | Chae et al. | |
| 6,482,331 B2 | 11/2002 | Lu et al. | |
| 6,483,989 B1 | 11/2002 | Okada et al. | |
| 6,511,539 B1 | 1/2003 | Raaijmakers | |
| 6,521,295 B1 | 2/2003 | Remington | |
| 6,534,395 B2 | 3/2003 | Werkhoven et al. | |
| 6,569,239 B2 | 5/2003 | Arai et al. | |
| 6,579,833 B1 | 6/2003 | McNallan et al. | |
| 6,590,251 B2 | 7/2003 | Kang et al. | |
| 6,594,550 B1 | 7/2003 | Okrah | |
| 6,598,559 B1 | 7/2003 | Vellore et al. | |
| 6,627,503 B2 | 9/2003 | Ma et al. | |
| 6,633,364 B2 | 10/2003 | Hayashi | |
| 6,645,304 B2 | 11/2003 | Yamaguchi | |
| 6,648,974 B1 | 11/2003 | Ogliari et al. | |
| 6,673,196 B1 | 1/2004 | Oyabu | |
| 6,682,973 B1 | 1/2004 | Paton et al. | |
| 6,709,989 B2 | 3/2004 | Ramdani et al. | |
| 6,710,364 B2 | 3/2004 | Guldi et al. | |
| 6,734,090 B2 | 5/2004 | Agarwala et al. | |
| 6,820,570 B2 | 11/2004 | Kilpela et al. | |
| 6,821,910 B2 | 11/2004 | Adomaitis et al. | |
| 6,824,665 B2 | 11/2004 | Shelnut et al. | |
| 6,847,014 B1 | 1/2005 | Benjamin et al. | |
| 6,858,524 B2 | 2/2005 | Haukka et al. | |
| 6,858,547 B2 | 2/2005 | Metzner | |
| 6,863,019 B2 | 3/2005 | Shamouilian et al. | |
| 6,874,480 B1 | 4/2005 | Ismailov | |
| 6,875,677 B1 | 4/2005 | Conley, Jr. et al. | |
| 6,884,066 B2 | 4/2005 | Nguyen et al. | |
| 6,884,319 B2 | 4/2005 | Kim | |
| 6,889,864 B2 | 5/2005 | Lindfors et al. | |
| 6,909,839 B2 | 6/2005 | Wang et al. | |
| 6,930,059 B2 | 8/2005 | Conley, Jr. et al. | |
| 6,935,269 B2 | 8/2005 | Lee et al. | |
| 6,955,836 B2 | 10/2005 | Kumagai et al. | |
| 6,972,478 B1 | 12/2005 | Waite et al. | |
| 7,045,430 B2 | 5/2006 | Ahn et al. | |
| 7,053,009 B2 | 5/2006 | Conley, Jr. et al. | |
| 7,071,051 B1 | 7/2006 | Jeon et al. | |
| 7,115,838 B2 | 10/2006 | Kurara et al. | |
| 7,122,085 B2 | 10/2006 | Shero et al. | |
| 7,129,165 B2 | 10/2006 | Basol et al. | |
| 7,132,360 B2 | 11/2006 | Schaeffer et al. | |
| 7,135,421 B2 | 11/2006 | Ahn et al. | |
| 7,147,766 B2 | 12/2006 | Uzoh et al. | |
| 7,172,497 B2 | 2/2007 | Basol et al. | |
| 7,192,824 B2 | 3/2007 | Ahn et al. | |
| 7,192,892 B2 | 3/2007 | Ahn et al. | |
| 7,195,693 B2 | 3/2007 | Cowans | |
| 7,204,887 B2 | 4/2007 | Kawamura et al. | |
| 7,205,247 B2 | 4/2007 | Lee et al. | |
| 7,235,501 B2 | 6/2007 | Ahn et al. | |
| 7,238,596 B2 | 7/2007 | Kouvetakis et al. | |
| D553,104 S | 10/2007 | Oohashi et al. | |
| 7,298,009 B2 | 11/2007 | Yan et al. | |
| D557,226 S | 12/2007 | Uchino et al. | |
| 7,312,494 B2 | 12/2007 | Ahn et al. | |
| 7,329,947 B2 | 2/2008 | Adachi et al. | |
| 7,357,138 B2 | 4/2008 | Ji et al. | |
| 7,393,418 B2 | 7/2008 | Yokogawa | |
| 7,393,736 B2 | 7/2008 | Ahn et al. | |
| 7,402,534 B2 | 7/2008 | Mahajani | |
| 7,405,166 B2 | 7/2008 | Liang et al. | |
| 7,405,454 B2 | 7/2008 | Ahn et al. | |
| 7,414,281 B1 | 8/2008 | Fastow | |
| 7,431,966 B2 | 10/2008 | Derderian et al. | |
| 7,437,060 B2 | 10/2008 | Wang et al. | |
| 7,442,275 B2 | 10/2008 | Cowans | |
| 7,489,389 B2 | 2/2009 | Shibazaki | |
| D593,969 S | 6/2009 | Li | |
| 7,547,363 B2 | 6/2009 | Tomiyasu et al. | |
| 7,575,968 B2 | 8/2009 | Sadaka et al. | |
| 7,589,003 B2 | 9/2009 | Kouvetakis et al. | |
| 7,601,223 B2 | 10/2009 | Lindfors et al. | |
| 7,601,225 B2 | 10/2009 | Tuominen et al. | |
| 7,640,142 B2 | 12/2009 | Tachikawa et al. | |
| 7,651,583 B2 | 1/2010 | Kent et al. | |
| D609,655 S | 2/2010 | Sugimoto | |
| 7,678,197 B2 | 3/2010 | Maki | |
| D614,153 S | 4/2010 | Fondurulia et al. | |
| 7,720,560 B2 | 5/2010 | Menser et al. | |
| 7,723,648 B2 | 5/2010 | Tsukamoto et al. | |
| 7,740,705 B2 | 6/2010 | Li | |
| 7,780,440 B2 | 8/2010 | Shibagaki et al. | |
| 7,833,353 B2 | 11/2010 | Furukawahara et al. | |
| 7,838,084 B2 | 11/2010 | Derderian et al. | |
| 7,851,019 B2 | 12/2010 | Tuominen et al. | |
| 7,884,918 B2 | 2/2011 | Hattori | |
| D634,719 S | 3/2011 | Yasuda et al. | |
| 8,041,197 B2 | 10/2011 | Kasai et al. | |
| 8,055,378 B2 | 11/2011 | Numakura | |

(56) References Cited

U.S. PATENT DOCUMENTS

| | | |
|---|---|---|
| 8,071,451 B2 | 12/2011 | Berry |
| 8,071,452 B2 | 12/2011 | Raisanen |
| 8,072,578 B2 | 12/2011 | Yasuda |
| 8,076,230 B2 | 12/2011 | Wei |
| 8,076,237 B2 | 12/2011 | Uzoh |
| 8,082,946 B2 | 12/2011 | Laverdiere et al. |
| 8,092,604 B2 | 1/2012 | Tomiyasu et al. |
| 8,137,462 B2 | 3/2012 | Fondurulia et al. |
| 8,147,242 B2 | 4/2012 | Shibagaki et al. |
| 8,216,380 B2 | 7/2012 | White et al. |
| 8,278,176 B2 | 10/2012 | Bauer et al. |
| 8,282,769 B2 | 10/2012 | Iizuka |
| 8,287,648 B2 | 10/2012 | Reed et al. |
| 8,293,016 B2 | 10/2012 | Bahng et al. |
| 8,309,173 B2 | 11/2012 | Tuominen et al. |
| 8,323,413 B2 | 12/2012 | Son |
| 8,367,528 B2 | 2/2013 | Bauer et al. |
| 8,372,204 B2 | 2/2013 | Nakamura |
| 8,444,120 B2 | 5/2013 | Gregg et al. |
| 8,506,713 B2 | 8/2013 | Takagi |
| D691,974 S | 10/2013 | Osada et al. |
| 8,608,885 B2 | 12/2013 | Goto et al. |
| 8,683,943 B2 | 4/2014 | Onodera et al. |
| 8,711,338 B2 | 4/2014 | Liu et al. |
| D705,745 S | 5/2014 | Kurs et al. |
| 8,726,837 B2 | 5/2014 | Patalay et al. |
| 8,728,832 B2 | 5/2014 | Raisanen et al. |
| 8,802,201 B2 | 8/2014 | Raisanen et al. |
| D716,742 S | 11/2014 | Jang et al. |
| 8,877,655 B2 | 11/2014 | Shero et al. |
| 8,883,270 B2 | 11/2014 | Shero et al. |
| 8,933,375 B2 | 1/2015 | Dunn et al. |
| 8,946,830 B2 | 2/2015 | Jung et al. |
| 8,986,456 B2 | 3/2015 | Fondurulia et al. |
| 8,993,054 B2 | 3/2015 | Jung et al. |
| 9,005,539 B2 | 4/2015 | Halpin et al. |
| 9,017,481 B1 | 4/2015 | Pettinger et al. |
| 9,018,111 B2 | 4/2015 | Milligan et al. |
| 9,021,985 B2 | 5/2015 | Alokozai et al. |
| 9,029,253 B2 | 5/2015 | Milligan et al. |
| 9,096,931 B2 | 8/2015 | Yednak et al. |
| 2001/0017103 A1 | 8/2001 | Takeshita et al. |
| 2001/0046765 A1 | 11/2001 | Cappellani et al. |
| 2002/0001974 A1 | 1/2002 | Chan |
| 2002/0011210 A1 | 1/2002 | Satoh et al. |
| 2002/0064592 A1 | 5/2002 | Datta et al. |
| 2002/0098627 A1 | 7/2002 | Pomarede et al. |
| 2002/0108670 A1 | 8/2002 | Baker et al. |
| 2002/0115252 A1 | 8/2002 | Haukka et al. |
| 2002/0172768 A1 | 11/2002 | Endo et al. |
| 2002/0187650 A1 | 12/2002 | Blalock et al. |
| 2003/0019580 A1 | 1/2003 | Strang |
| 2003/0025146 A1 | 2/2003 | Narwankar et al. |
| 2003/0040158 A1 | 2/2003 | Saitoh |
| 2003/0042419 A1 | 3/2003 | Katsumata et al. |
| 2003/0066826 A1 | 4/2003 | Lee et al. |
| 2003/0075925 A1 | 4/2003 | Lindfors et al. |
| 2003/0094133 A1 | 5/2003 | Yoshidome et al. |
| 2003/0111963 A1 | 6/2003 | Tolmachev et al. |
| 2003/0141820 A1 | 7/2003 | White et al. |
| 2003/0168001 A1 | 9/2003 | Sneh |
| 2003/0180458 A1 | 9/2003 | Sneh |
| 2003/0192875 A1* | 10/2003 | Bieker ............... F16L 53/005 219/528 |
| 2003/0228772 A1 | 12/2003 | Cowans |
| 2003/0232138 A1 | 12/2003 | Tuominen et al. |
| 2004/0009679 A1 | 1/2004 | Yeo et al. |
| 2004/0013577 A1 | 1/2004 | Ganguli et al. |
| 2004/0018307 A1 | 1/2004 | Park et al. |
| 2004/0018750 A1 | 1/2004 | Sophie et al. |
| 2004/0023516 A1 | 2/2004 | Londergan et al. |
| 2004/0036129 A1 | 2/2004 | Forbes et al. |
| 2004/0077182 A1 | 4/2004 | Lim et al. |
| 2004/0101622 A1 | 5/2004 | Park et al. |
| 2004/0106249 A1 | 6/2004 | Huotari |
| 2004/0144980 A1 | 7/2004 | Ahn et al. |
| 2004/0168627 A1 | 9/2004 | Conley et al. |
| 2004/0169032 A1 | 9/2004 | Murayama et al. |
| 2004/0198069 A1 | 10/2004 | Metzner et al. |
| 2004/0200499 A1 | 10/2004 | Harvey et al. |
| 2004/0219793 A1 | 11/2004 | Hishiya et al. |
| 2004/0221807 A1 | 11/2004 | Verghese et al. |
| 2004/0266011 A1 | 12/2004 | Lee et al. |
| 2005/0008799 A1 | 1/2005 | Tomiyasu et al. |
| 2005/0019026 A1 | 1/2005 | Wang et al. |
| 2005/0020071 A1 | 1/2005 | Sonobe et al. |
| 2005/0023624 A1 | 2/2005 | Ahn et al. |
| 2005/0054228 A1* | 3/2005 | March ..................... 439/191 |
| 2005/0066893 A1 | 3/2005 | Soininen |
| 2005/0070123 A1 | 3/2005 | Hirano |
| 2005/0072357 A1 | 4/2005 | Shero et al. |
| 2005/0092249 A1 | 5/2005 | Kilpela et al. |
| 2005/0100669 A1 | 5/2005 | Kools et al. |
| 2005/0106893 A1 | 5/2005 | Wilk |
| 2005/0110069 A1 | 5/2005 | Kil et al. |
| 2005/0123690 A1 | 6/2005 | Derderian et al. |
| 2005/0173003 A1 | 8/2005 | Laverdiere et al. |
| 2005/0187647 A1 | 8/2005 | Wang et al. |
| 2005/0212119 A1 | 9/2005 | Shero |
| 2005/0214457 A1 | 9/2005 | Schmitt et al. |
| 2005/0214458 A1 | 9/2005 | Meiere |
| 2005/0218462 A1 | 10/2005 | Ahn et al. |
| 2005/0229848 A1 | 10/2005 | Shinriki |
| 2005/0229972 A1 | 10/2005 | Hoshi et al. |
| 2005/0241176 A1 | 11/2005 | Shero et al. |
| 2005/0263075 A1 | 12/2005 | Wang et al. |
| 2005/0271813 A1 | 12/2005 | Kher et al. |
| 2005/0282101 A1 | 12/2005 | Adachi |
| 2005/0287725 A1 | 12/2005 | Kitagawa |
| 2006/0013946 A1 | 1/2006 | Park et al. |
| 2006/0014384 A1 | 1/2006 | Lee et al. |
| 2006/0019033 A1 | 1/2006 | Muthukrishnan et al. |
| 2006/0024439 A2 | 2/2006 | Tuominen et al. |
| 2006/0046518 A1 | 3/2006 | Hill et al. |
| 2006/0051925 A1 | 3/2006 | Ahn et al. |
| 2006/0060930 A1 | 3/2006 | Metz et al. |
| 2006/0062910 A1 | 3/2006 | Meiere |
| 2006/0063346 A1 | 3/2006 | Lee et al. |
| 2006/0068125 A1 | 3/2006 | Radhakrishnan |
| 2006/0110934 A1 | 5/2006 | Fukuchi |
| 2006/0113675 A1 | 6/2006 | Chang et al. |
| 2006/0128168 A1 | 6/2006 | Ahn et al. |
| 2006/0148180 A1 | 7/2006 | Ahn et al. |
| 2006/0163612 A1 | 7/2006 | Kouvetakis et al. |
| 2006/0193979 A1 | 8/2006 | Meiere et al. |
| 2006/0208215 A1 | 9/2006 | Metzner et al. |
| 2006/0213439 A1 | 9/2006 | Ishizaka |
| 2006/0223301 A1 | 10/2006 | Vanhaelemeersch et al. |
| 2006/0226117 A1 | 10/2006 | Bertram et al. |
| 2006/0228888 A1 | 10/2006 | Lee et al. |
| 2006/0240574 A1 | 10/2006 | Yoshie |
| 2006/0257563 A1 | 11/2006 | Doh et al. |
| 2006/0257584 A1 | 11/2006 | Derderian et al. |
| 2006/0258078 A1 | 11/2006 | Lee et al. |
| 2006/0266289 A1 | 11/2006 | Verghese et al. |
| 2007/0010072 A1 | 1/2007 | Bailey et al. |
| 2007/0020953 A1 | 1/2007 | Tsai et al. |
| 2007/0022954 A1 | 2/2007 | Iizuka et al. |
| 2007/0028842 A1 | 2/2007 | Inagawa et al. |
| 2007/0031598 A1 | 2/2007 | Okuyama et al. |
| 2007/0031599 A1 | 2/2007 | Gschwandtner et al. |
| 2007/0037412 A1 | 2/2007 | Dip et al. |
| 2007/0042117 A1 | 2/2007 | Kupurao et al. |
| 2007/0049053 A1 | 3/2007 | Mahajani |
| 2007/0059948 A1 | 3/2007 | Metzner et al. |
| 2007/0065578 A1 | 3/2007 | McDougall |
| 2007/0066010 A1 | 3/2007 | Ando |
| 2007/0077355 A1 | 4/2007 | Chacin et al. |
| 2007/0084405 A1 | 4/2007 | Kim |
| 2007/0096194 A1 | 5/2007 | Streck et al. |
| 2007/0116873 A1 | 5/2007 | Li et al. |
| 2007/0134942 A1 | 6/2007 | Ahn et al. |
| 2007/0146621 A1 | 6/2007 | Yeom |
| 2007/0155138 A1 | 7/2007 | Tomasini et al. |

(56) References Cited

U.S. PATENT DOCUMENTS

| | | |
|---|---|---|
| 2007/0163440 A1 | 7/2007 | Kim et al. |
| 2007/0166457 A1 | 7/2007 | Yamoto et al. |
| 2007/0175397 A1 | 8/2007 | Tomiyasu et al. |
| 2007/0209590 A1 | 9/2007 | Li |
| 2007/0232501 A1 | 10/2007 | Tonomura |
| 2007/0237697 A1 | 10/2007 | Clark |
| 2007/0249131 A1 | 10/2007 | Allen et al. |
| 2007/0252244 A1 | 11/2007 | Srividya et al. |
| 2007/0264807 A1 | 11/2007 | Leone et al. |
| 2008/0006208 A1 | 1/2008 | Ueno et al. |
| 2008/0029790 A1 | 2/2008 | Ahn et al. |
| 2008/0054332 A1 | 3/2008 | Kim et al. |
| 2008/0057659 A1 | 3/2008 | Forbes et al. |
| 2008/0075881 A1 | 3/2008 | Won et al. |
| 2008/0085226 A1 | 4/2008 | Fondurulia et al. |
| 2008/0113096 A1 | 5/2008 | Mahajani |
| 2008/0113097 A1 | 5/2008 | Mahajani et al. |
| 2008/0124908 A1 | 5/2008 | Forbes et al. |
| 2008/0149031 A1 | 6/2008 | Chu et al. |
| 2008/0176375 A1 | 7/2008 | Erben et al. |
| 2008/0216077 A1 | 9/2008 | Emani et al. |
| 2008/0224240 A1 | 9/2008 | Ahn et al. |
| 2008/0233288 A1 | 9/2008 | Clark |
| 2008/0237572 A1 | 10/2008 | Chui et al. |
| 2008/0248310 A1 | 10/2008 | Kim et al. |
| 2008/0261413 A1 | 10/2008 | Mahajani |
| 2008/0282970 A1 | 11/2008 | Heys et al. |
| 2008/0315292 A1 | 12/2008 | Ji et al. |
| 2009/0000550 A1 | 1/2009 | Tran et al. |
| 2009/0011608 A1 | 1/2009 | Nabatame |
| 2009/0020072 A1 | 1/2009 | Mizunaga et al. |
| 2009/0029564 A1 | 1/2009 | Yamashita et al. |
| 2009/0035947 A1 | 2/2009 | Horii |
| 2009/0061644 A1 | 3/2009 | Chiang et al. |
| 2009/0085156 A1 | 4/2009 | Dewey et al. |
| 2009/0093094 A1 | 4/2009 | Ye et al. |
| 2009/0095221 A1 | 4/2009 | Tam et al. |
| 2009/0107404 A1 | 4/2009 | Ogliari et al. |
| 2009/0136668 A1 | 5/2009 | Gregg et al. |
| 2009/0139657 A1 | 6/2009 | Lee et al. |
| 2009/0211523 A1 | 8/2009 | Kuppurao et al. |
| 2009/0211525 A1 | 8/2009 | Sarigiannis et al. |
| 2009/0239386 A1 | 9/2009 | Suzaki et al. |
| 2009/0242957 A1 | 10/2009 | Ma et al. |
| 2009/0246374 A1 | 10/2009 | Vukovic |
| 2009/0261331 A1 | 10/2009 | Yang et al. |
| 2009/0277510 A1 | 11/2009 | Shikata |
| 2009/0283041 A1 | 11/2009 | Tomiyasu et al. |
| 2009/0289300 A1 | 11/2009 | Sasaki et al. |
| 2010/0024727 A1 | 2/2010 | Kim et al. |
| 2010/0025796 A1 | 2/2010 | Dabiran |
| 2010/0055312 A1 | 3/2010 | Kato et al. |
| 2010/0075507 A1 | 3/2010 | Chang et al. |
| 2010/0102417 A1 | 4/2010 | Ganguli et al. |
| 2010/0124610 A1 | 5/2010 | Aikawa et al. |
| 2010/0130017 A1 | 5/2010 | Luo et al. |
| 2010/0162752 A1 | 7/2010 | Tabata et al. |
| 2010/0170441 A1 | 7/2010 | Won et al. |
| 2010/0193501 A1 | 8/2010 | Zucker et al. |
| 2010/0230051 A1 | 9/2010 | Iizuka |
| 2010/0255198 A1 | 10/2010 | Cleary et al. |
| 2010/0275846 A1 | 11/2010 | Kitagawa |
| 2010/0294199 A1 | 11/2010 | Tran et al. |
| 2010/0307415 A1 | 12/2010 | Shero et al. |
| 2010/0322604 A1 | 12/2010 | Fondurulia et al. |
| 2011/0000619 A1 | 1/2011 | Suh |
| 2011/0061810 A1 | 3/2011 | Ganguly et al. |
| 2011/0070380 A1 | 3/2011 | Shero et al. |
| 2011/0089469 A1 | 4/2011 | Merckling |
| 2011/0097901 A1 | 4/2011 | Banna et al. |
| 2011/0108194 A1 | 5/2011 | Yoshioka et al. |
| 2011/0236600 A1 | 9/2011 | Fox et al. |
| 2011/0239936 A1 | 10/2011 | Suzaki et al. |
| 2011/0254052 A1 | 10/2011 | Kouvetakis |
| 2011/0256734 A1 | 10/2011 | Hausmann et al. |
| 2011/0275166 A1 | 11/2011 | Shero et al. |
| 2011/0308460 A1 | 12/2011 | Hong et al. |
| 2012/0024479 A1 | 2/2012 | Palagashvili et al. |
| 2012/0070136 A1 | 3/2012 | Koelmel et al. |
| 2012/0070997 A1 | 3/2012 | Larson |
| 2012/0090704 A1 | 4/2012 | Laverdiere et al. |
| 2012/0098107 A1 | 4/2012 | Raisanen et al. |
| 2012/0114877 A1 | 5/2012 | Lee |
| 2012/0156108 A1 | 6/2012 | Fondurulia et al. |
| 2012/0160172 A1 | 6/2012 | Wamura et al. |
| 2012/0240858 A1 | 9/2012 | Taniyama et al. |
| 2012/0270393 A1 | 10/2012 | Pore et al. |
| 2012/0289053 A1 | 11/2012 | Holland et al. |
| 2012/0295427 A1 | 11/2012 | Bauer |
| 2012/0304935 A1 | 12/2012 | Oosterlaken et al. |
| 2012/0318334 A1 | 12/2012 | Bedell et al. |
| 2012/0321786 A1 | 12/2012 | Satitpunwaycha et al. |
| 2013/0023129 A1 | 1/2013 | Reed |
| 2013/0104988 A1 | 5/2013 | Yednak et al. |
| 2013/0104992 A1 | 5/2013 | Yednak et al. |
| 2013/0115383 A1 | 5/2013 | Lu et al. |
| 2013/0126515 A1 | 5/2013 | Shero et al. |
| 2013/0129577 A1 | 5/2013 | Halpin et al. |
| 2013/0230814 A1 | 9/2013 | Dunn et al. |
| 2013/0256838 A1 | 10/2013 | Sanchez et al. |
| 2013/0264659 A1 | 10/2013 | Jung |
| 2013/0292676 A1 | 11/2013 | Milligan et al. |
| 2013/0292807 A1 | 11/2013 | Raisanen et al. |
| 2013/0330911 A1 | 12/2013 | Huang et al. |
| 2014/0000843 A1 | 1/2014 | Dunn et al. |
| 2014/0014644 A1 | 1/2014 | Akiba et al. |
| 2014/0020619 A1 | 1/2014 | Vincent et al. |
| 2014/0027884 A1 | 1/2014 | Tang et al. |
| 2014/0036274 A1 | 2/2014 | Marquardt et al. |
| 2014/0060147 A1 | 3/2014 | Sarin et al. |
| 2014/0067110 A1 | 3/2014 | Lawson et al. |
| 2014/0073143 A1 | 3/2014 | Alokozai et al. |
| 2014/0077240 A1 | 3/2014 | Roucka et al. |
| 2014/0084341 A1 | 3/2014 | Weeks |
| 2014/0087544 A1 | 3/2014 | Tolle |
| 2014/0103145 A1 | 4/2014 | White et al. |
| 2014/0120487 A1 | 5/2014 | Kaneko |
| 2014/0159170 A1 | 6/2014 | Raisanen et al. |
| 2014/0175054 A1 | 6/2014 | Carlson et al. |
| 2014/0217065 A1 | 8/2014 | Winkler et al. |
| 2014/0220247 A1 | 8/2014 | Haukka et al. |
| 2014/0225065 A1 | 8/2014 | Rachmady et al. |
| 2014/0251953 A1 | 9/2014 | Winkler et al. |
| 2014/0251954 A1 | 9/2014 | Winkler et al. |
| 2014/0346650 A1 | 11/2014 | Raisanen et al. |
| 2015/0004316 A1 | 1/2015 | Thompson et al. |
| 2015/0014632 A1 | 1/2015 | Kim et al. |
| 2015/0024609 A1 | 1/2015 | Milligan et al. |
| 2015/0048485 A1 | 2/2015 | Tolle |
| 2015/0091057 A1 | 4/2015 | Xie et al. |
| 2015/0096973 A1 | 4/2015 | Dunn et al. |
| 2015/0132212 A1 | 5/2015 | Winkler et al. |
| 2015/0140210 A1 | 5/2015 | Jung et al. |
| 2015/0147877 A1 | 5/2015 | Jung |
| 2015/0167159 A1 | 6/2015 | Halpin et al. |
| 2015/0184291 A1 | 7/2015 | Alokozai et al. |
| 2015/0187568 A1 | 7/2015 | Pettinger et al. |

FOREIGN PATENT DOCUMENTS

| | | |
|---|---|---|
| CN | 101522943 | 9/2009 |
| CN | 101423937 A | 9/2011 |
| EP | 2036600 | 3/2009 |
| JP | 07283149 | 10/1995 |
| JP | 08335558 | 12/1996 |
| JP | 2001342570 | 12/2001 |
| JP | 2004014952 A | 1/2004 |
| JP | 2004091848 | 3/2004 |
| JP | 2004538374 | 12/2004 |
| JP | 2005507030 | 3/2005 |
| JP | 2006186271 | 7/2006 |
| JP | 2008527748 | 7/2008 |
| TW | I226380 | 1/2005 |

(56) References Cited

FOREIGN PATENT DOCUMENTS

| TW | 200701301 A | 1/2007 |
|---|---|---|
| WO | 2006/056091 A1 | 6/2006 |
| WO | 2006/078666 | 7/2006 |

OTHER PUBLICATIONS

USPTO; Office Action dated Feb. 25, 2014 in U.S. Appl. No. 12/754,223.
USPTO; Restriction Requirement dated Sep. 25, 2012 in U.S. Appl. No. 12/854,818.
USPTO; Office Action dated Dec. 6, 2012 in U.S. Appl. No. 12/854,818.
USPTO; Final Office Action dated Mar. 13, 2013 in U.S. Appl. No. 12/854,818.
USPTO; Office Action dated Aug. 30, 2013 in U.S. Appl. No. 12/854,818.
USPTO; Final Office Action dated Mar. 26, 2014 in U.S. Appl. No. 12/854,818.
USPTO; Restriction Requirement dated May 8, 2013 in U.S. Appl. No. 13/102,980.
USPTO; Office Action dated Oct. 7, 2013 in U.S. Appl. No. 13/102,980.
USPTO; Final Office Action dated Mar. 25, 2014 in U.S. Appl. No. 13/102,980.
USPTO; Restriction Requirement dated Dec. 16, 2013 in U.S. Appl. No. 13/284,642.
USPTO; Restriction Requirement dated Apr. 21, 2014 in U.S. Appl. No. 13/284,642.
USPTO; Office Action dated Jan. 28, 2014 in U.S. Appl. No. 13/312,591.
USPTO; Final Office Action dated May 14, 2014 in U.S. Appl. No. 13/312,591.
USPTO; Office Action dated Jan. 10, 2013 in U.S. Appl. No. 13/339,609.
USPTO; Office Action dated Feb. 11, 2013 in U.S. Appl. No. 13/339,609.
USPTO; Final Office Action dated May 17, 2013 in U.S. Appl. No. 13/339,609.
USPTO; Office Action dated Aug. 29, 2013 in U.S. Appl. No. 13/339,609.
USPTO; Final Office Action dated Dec. 18, 2013 in U.S. Appl. No. 13/339,609.
USPTO; Notice of Allowance dated Apr. 7, 2014 in U.S. Appl. No. 13/339,609.
USPTO; Office Action dated Feb. 13, 2014 in U.S. Appl. No. 13/411,271.
USPTO; Restriction Requirement dated Oct. 29, 2013 in U.S. Appl. No. 13/439,258.
USPTO; Office Action dated Mar. 24, 2014 in U.S. Appl. No. 13/439,258.
USPTO; Office Action dated May 23, 2013 in U.S. Appl. No. 13/465,340.
USPTO; Final Office Action dated Oct. 30, 2013 in U.S. Appl. No. 13/465,340.
USPTO; Notice of Allowance dated Feb. 12, 2014 in U.S. Appl. No. 13/465,340.
USPTO; Office Action dated Dec. 20, 2013 in U.S. Appl. No. 13/535,214.
USPTO; Office Action dated Nov. 15, 2013 in U.S. Appl. No. 13/612,538.
USPTO; Office Action dated Apr. 24, 2014 in U.S. Appl. No. 13/784,362.
Chinese Patent Office; Notice on the First Office Action dated May 24, 2013 in Serial No. 201080036764.6.
Chinese Patent Office; Notice on the Second Office Action dated Jan. 2, 2014 in Serial No. 201080036764.6.
Japanese Patent Office; Office Action dated Dec. 25, 2014 in Serial No. 2012-504786.
USPTO; Office Action dated Aug. 27, 2010 in U.S. Appl. No. 12/118,596.
USPTO; Office Action dated Feb. 15, 2011 in U.S. Appl. No. 12/118,596.
USPTO; Notice of Allowance dated Aug. 4, 2011 in U.S. Appl. No. 12/118,596.
USPTO; Notice of Allowance dated Jun. 16, 2011 in U.S. Appl. No. 12/430,751.
USPTO; Notice of Allowance dated Jul. 27, 2011 in U.S. Appl. No. 12/430,751.
PCT; International Search report and Written Opinion dated Nov. 12, 2010 in Application No. PCT/US2010/030126.
PCT; International Preliminary Report on Patentability dated Oct. 20, 2011 in Application No. PCT/US2010/030126.
PCT; International Search report and Written Opinion dated Jan. 12, 2011 in Application No. PCT/US2010/045368.
Chang et al. Small-Subthreshold-Swing and Low-Voltage Flexible Organic Thin-Film Transistors Which Use HfLaO as the Gate Dielectric; IEEE Electron Device Letters; Feb. 2009; 133-135; vol. 30, No. 2; IEEE Electron Device Society.
Maeng et al. Electrical properties of atomic layer disposition Hf02 and HfOxNy on Si substrates with various crystal orientations, Journal of the Electrochemical Society, 2008-04, p. H267-H271, vol. 155, No. 4, Department of Materials Science and Engineering, Pohang University of Science and Technology, Pohang, Korea.
USPTO; Office Action dated Apr. 23, 2013 in U.S. Appl. No. 12/763,037.
USPTO; Office Action dated Jan. 15, 2013 in U.S. Appl. No. 12/754,223.
USPTO; Office Action dated Feb. 26, 2013 in U.S. Appl. No. 12/754,223.
PCT; International Search report and Written Opinion dated Feb. 6, 2013 in Application No. PCT/US2012/065343.
PCT; International Search report and Written Opinion dated Feb. 13, 2013 in Application No. PCT/US2012/065347.
Chinese Patent Office; Office Action dated Jan. 10, 2013 is Serial No. 201080015699.9.
Novaro et al. Theoretical Study on a Reaction Pathway of Ziegler-Natta-Type Catalysis, J. Chem. Phys. 68(5), Mar. 1, 1978 p. 2337-2351.
USPTO; Office Action dated Oct. 8, 2014 in U.S. Appl. No. 12/763,037.
USPTO; Non-Final Office Action dated Sep. 17, 2014 in U.S. Appl. No. 13/187,300.
USPTO; Non-Final Office Action dated Nov. 26, 2014 in U.S. Appl. No. 13/312,591.
USPTO; Notice of Allowance dated Oct. 21, 2014 in U.S. Appl. No. 13/439,528.
USPTO; Notice of Allowance dated Oct. 23, 2014 in U.S. Appl. No. 13/535,214.
USPTO; Non-Final Office Action dated Oct. 15, 2014 in U.S. Appl. No. 13/597,043.
USPTO; Final Office Action dated Nov. 14, 2014 in U.S. Appl. No. 13/677,151.
USPTO; Non-Final Office Action dated Oct. 9, 2014 in U.S. Appl. No. 13/874,708.
USPTO; Non-Final Office Action dated Sep. 19, 2014 in U.S. Appl. No. 13/791,246.
USPTO; Non-Final Office Action dated Sep. 12, 2014 in U.S. Appl. No. 13/941,134.
USPTO; Restriction Requirement dated Sep. 16, 2014 in U.S. Appl. No. 13/948,055.
USPTO; Non-Final Office Action dated Oct. 30, 2014 in U.S. Appl. No. 13/948,055.
USPTO; Final Office Action dated Nov. 7, 2014 in U.S. Appl. No. 14/183,187.
Chinese Patent Office; Notice on the Second Office Action dated Sep. 16, 2014 in Application No. 201110155056.
Koutsokeras et al. Texture and Microstructure Evolution in Single-Phase TixTal-xN Alloys of Rocksalt Structure. Journal of Applied Physics, 110, pp. 043535-1-043535-6, (2011).
USPTO; Final Office Action dated Jul. 14, 2014 in U.S. Appl. No. 12/754,223.

(56) References Cited

OTHER PUBLICATIONS

USPTO; Notice of Allowance dated Jul. 3, 2014 in U.S. Appl. No. 13/102,980.
USPTO; Non-Final Office Action dated Jul. 30, 2014 in U.S. Appl. No. 13/284,642.
USPTO; Non-Final Office Action dated Jul. 31, 2014 in U.S. Appl. No. 13/411,271.
USPTO Final Office Action dated Jul. 8, 2014 in U.S. Appl. No. 13/439,528.
USPTO; Final Office Action dated Jun. 18, 2014 in U.S. Appl. No. 13/535,214.
USPTO; Non-Final Office Action dated Aug. 8, 2014 in U.S. Appl. No. 13/563,066.
USPTO; Non-Final Office Action dated Jul. 10, 2014 in U.S. Appl. No. 13/612,538.
USPTO; Non-Final Office Action dated Jun. 2, 2014 in U.S. Appl. No. 13/677,151.
USPTO; Notice of Allowance dated Aug. 13, 2014 in U.S. Appl. No. 13/784,362.
USPTO; Restriction Requirement dated Jun. 26, 2014 in U.S. Appl. No. 13/874,708.
USPTO; Non-Final Office Action dated May 29, 2014 in U.S. Appl. No. 14/183,187.
Chinese Patent Office; Notice on the Third Office Action dated Jul. 1, 2014 in Application No. 201080036764.6.
Taiwan Patent Office; Office Action dated Jul. 4, 2014 in Application No. 099110511.
USPTO; Final Office Action dated Apr. 15, 2015 in U.S. Appl. No. 13/187,300.
USPTO; Final Office Action dated Mar. 20, 2015 in U.S. Appl. No. 13/312,591.
USPTO; Final Office Action dated Mar. 13, 2015 in U.S. Appl. No. 13/597,043.
USPTO; Non-Final Office Action dated Apr. 3, 2015 in U.S. Appl. No. 13/677,133.
USPTO; Notice of Allowance dated Mar. 10, 2015 in U.S. Appl. No. 13/874,708.
USPTO; Non-Final Office Action dated Mar. 19, 2015 in U.S. Appl. No. 14/079,302.
USPTO; Non-Final Office Action dated Mar. 19, 2015 in U.S. Appl. No. 14/166,462.
USPTO; Non-Final Office Action dated Mar. 16, 2015 in U.S. Appl. No. 14/183,187.
Crowell, "Chemical methods of thin film deposition: Chemical vapor deposition, atomic layer deposition, and related technologies," Journal of Vacuum Science & Technology A 21.5, (2003): S88-S95.
USPTO; Notice of Allowance dated Jan. 27, 2015 in U.S. Appl. No. 12/763,037.
USPTO; Final Office Action dated Jan. 29, 2015 in U.S. Appl. No. 13/283,408.
USPTO; Notice of Allowance dated Feb. 11, 2015 in U.S. Appl. No. 13/284,642.
USPTO; Final Office Action dated Jan. 16, 2015 in U.S. Appl. No. 13/411,271.
USPTO; Final Office Action dated Feb. 12, 2015 in U.S. Appl. No. 13/563,066.
USPTO; Non-Final Office Action dated Feb. 12, 2015 in U.S. Appl. No. 13/597,108.
USPTO; Notice of Allowance dated Feb. 26, 2015 in U.S. Appl. No. 13/677,151.
USPTO; Notice of Allowance dated Jan. 20, 2015 in U.S. Appl. No. 13/941,134.
USPTO; Non-Final Office Action dated Feb. 12, 2015 in U.S. Appl. No. 14/457,058.
USPTO; Non-Final Office Action dated Jan. 16, 2015 in U.S. Appl. No. 14/563,044.
Chinese Patent Office; Office Action dated Jan. 12, 2015 in Application No. 201080015699.9.
Chinese Patent Office; Notice on the Third Office Action dated Feb. 9, 2015 in Application No. 201110155056.
Taiwan Patent Office; Office Action dated Dec. 30, 2014 in Application No. 099114330.
Taiwan Patent Office; Office Action dated Dec. 19, 2014 in Application No. 099127063.
USPTO; Final Office Action dated Aug. 12, 2015 in U.S. Appl. No. 12/754,223.
USPTO; Non-Final Office Action dated Jun. 17, 2015 in U.S. Appl. No. 13/283,408.
USPTO; Notice of Allowance dated Jun. 12, 2015 in U.S. Appl. No. 13/563,066.
USPTO; Notice of Allowance dated Jul. 16, 2015 in U.S. Appl. No. 13/563,066.
USPTO; Notice of Allowance dated Aug. 4, 2015 in U.S. Appl. No. 13/677,133.
USPTO; Non-Final Office Action dated Jul. 30, 2015 in U.S. Appl. No. 13/941,216.
USPTO; Non-Final Office Action dated Jun. 29, 2015 in U.S. Appl. No. 13/966,782.
USPTO; Final Office Action dated Jul. 14, 2015 in U.S. Appl. No. 14/457,058.
USPTO; Notice of Allowance dated Jul. 6, 2015 in U.S. Appl. No. 29/447,298.
USPTO; Notice of Allowance dated May 14, 2015 in U.S. Appl. No. 13/312,591.
USPTO; Final Office Action dated Jun. 1, 2015 in U.S. Appl. No. 13/597,108.
USPTO; Non-Final Office Action dated May 28, 2015 in U.S. Appl. No. 13/651,144.
USPTO; Final Office Action dated Mar. 25, 2015 in U.S. Appl. No. 13/791,246.
USPTO; Restriction Requirement dated Apr. 30, 2015 in U.S. Appl. No. 13/941,216.
USPTO; Non-Final Office Action dated Apr. 7, 2015 in U.S. Appl. No. 14/018,345.
USPTO; Non-Final Office Action dated Apr. 28, 2015 in U.S. Appl. No. 14/040,196.
USPTO; Non-Final Office Action dated Mar. 16, 2015 in U.S. Appl. No. 29/447,298.
Bearzotti, et al., "Fast Humidity Response of a Metal Halide-Doped Novel Polymer," Sensors and Actuators B, 7, pp. 451-454, (1992).
Varma, et al., "Effect of Mtal Halides on Thermal, Mechanical, and Electrical Properties of Polypyromelitimide Films," Journal of Applied Polymer Science, vol. 32, pp. 3987-4000, (1986).

\* cited by examiner

HEATER JACKET FOR A FLUID LINE

FIELD OF THE INVENTION

This disclosure relates generally to semiconductor processing equipment, and more particularly to heater jackets for semiconductor processing fluid lines.

BACKGROUND

Semiconductor fabrication processes are typically conducted with the substrates supported within a chamber under controlled conditions. Some of the important controlled conditions include, but are not limited to, fluid flow rate into the reaction chamber, temperature of the reaction chamber, temperature of the fluid flowing into the reaction chamber, and temperature of the fluid throughout the fluid line.

Fluid lines are generally used to convey an applicable fluid from a source container or other supply apparatus to the reaction space for processing. The fluid line may carry a liquid, gaseous, or even solid containing solution material depending on the application. Further, the size, shape, and arrangement of the fluid lines may be custom designed based on precursor demands and space constraints within the semiconductor fabrication facility.

In order to obtain a consistent reaction environment, maintaining the correct flow rate of precursor at a correct temperature are among the key factors. However, the importance of maintaining the temperature of the precursors at a uniform temperature is not limited to just the reaction chamber. A number of precursors have a limited temperature range of gaseous phase composition. Thus, in order to maintain the correct flow rate, the precursor must be maintained within a slim temperature range from the source container, through the fluid line, and finally into the reaction chamber.

A number of heater jackets have been developed in an attempt to maintain consistent fluid temperatures during the transition from the temperature controlled source container to the reaction chamber. One common example is cloth heater jackets which surround the fluid line and include a cloth inner layer in contact with the fluid line. The cloth heater jacket may be generally flexible, but is difficult to position on fluid lines with bends. Further, if a heating element is also included, the heating element is generally in contact with or close to the fluid line and a thermocouple may inadvertently read higher or lower temperatures because the heating element is contacting the same surface as the thermocouple. Still further, since the heater jacket is in direct contact with the fluid line, there may be additional wear and tear on the inner surface of the heater jacket from the contact with the fluid line, particularly around bends in the fluid line or at microfittings.

An alternative to heater jackets includes heat tape, which is inexpensive but time consuming to install. Further, when a section of the fluid line needs to be worked on or replaced, the heat tape must be removed, scraped, and a new section installed in its place.

SUMMARY

Various aspects and implementations are disclosed herein that relate to heater jackets and methods of maintaining a temperature in a semiconductor processing tool. In one aspect, a heater jacket for a fluid line may include a tube having an inner surface and an outer surface, a spacer disposed within the tube between the inner surface and the fluid line, and wherein the spacer includes a hole for receiving the fluid line therein and spaces the fluid line from the tube inner surface.

In an implementation, the inner surface may further include a recess. A heater element may be disposed within the recess. The heating element may provide radiant heating to the fluid line. The recess may be spirally disposed within the inner surface. The spacer may further include an outer surface in contact with the tube inner surface. The spacer may be solid between the spacer hole and the spacer outer surface. The spacer may include a plurality of apertures between the spacer hole and the spacer outer surface. The plurality of apertures may be pores.

A plurality of spacers may be disposed along a length of the fluid line. A fluid line temperature between each spacer is the same throughout the length of the fluid line. A fluid line temperature between each spacer varies throughout the length of the fluid line. The fluid line may further include a microfitting and one of the plurality of spacers is located on each side of the microfitting. The microfitting may include a 45 degree angle bend. The tube inner surface may or may not contact the microfitting. An air gap may be located between the tube inner surface and the fluid line outer surface to radiantly heat the fluid line with a heating element.

In another aspect, a reaction system may include a reaction chamber operatively connected to a fluid line, the fluid line including a tube having an inner surface and an outer surface, a spacer disposed within the tube between the inner surface and the fluid line, and wherein the spacer includes a hole for receiving the fluid line and spaces the fluid line from the tube inner surface.

The reaction system may include a plurality of spacers, wherein the tube inner surface contacts the plurality of spacers and does not contact the fluid line. A heating element may be embedded in the tube inner wall and providing radiant heat to the fluid line. The spacer may be solid between the spacer hole and a spacer outer surface. The spacer may further include a plurality of apertures between the hole and a spacer outer surface. The spacer may further include a first half having a pair of through holes and a second half having a pair of threaded holes and a pair of screws are inserted through the first half through holes and screwed into the second half threaded holes to mount the spacer on the fluid line. A heating element may be embedded in the tuber inner wall and provide convection heating to the fluid line.

In still another aspect, a method of maintaining a fluid temperature in a semiconductor processing machine including the steps of: providing a reaction chamber in communication with a fluid line wherein the fluid line includes a tube having an inner surface and an outer surface, a spacer disposed within the tube between the inner surface and the fluid line, and wherein the spacer includes a hole for receiving the fluid line and spaces the fluid line from the tube inner surface, providing a heating element between the fluid line and the tube, powering the heating element to increase a temperature of a fluid between the fluid line and the tube, monitoring a temperature of the fluid line, and controlling the temperature of the fluid between the fluid line and the tube in response to monitoring the temperature of the fluid line.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3A is a front view of a heater jacket laid open to illustrate the interior of the heater jacket.

DETAILED DESCRIPTION

Figure 1:
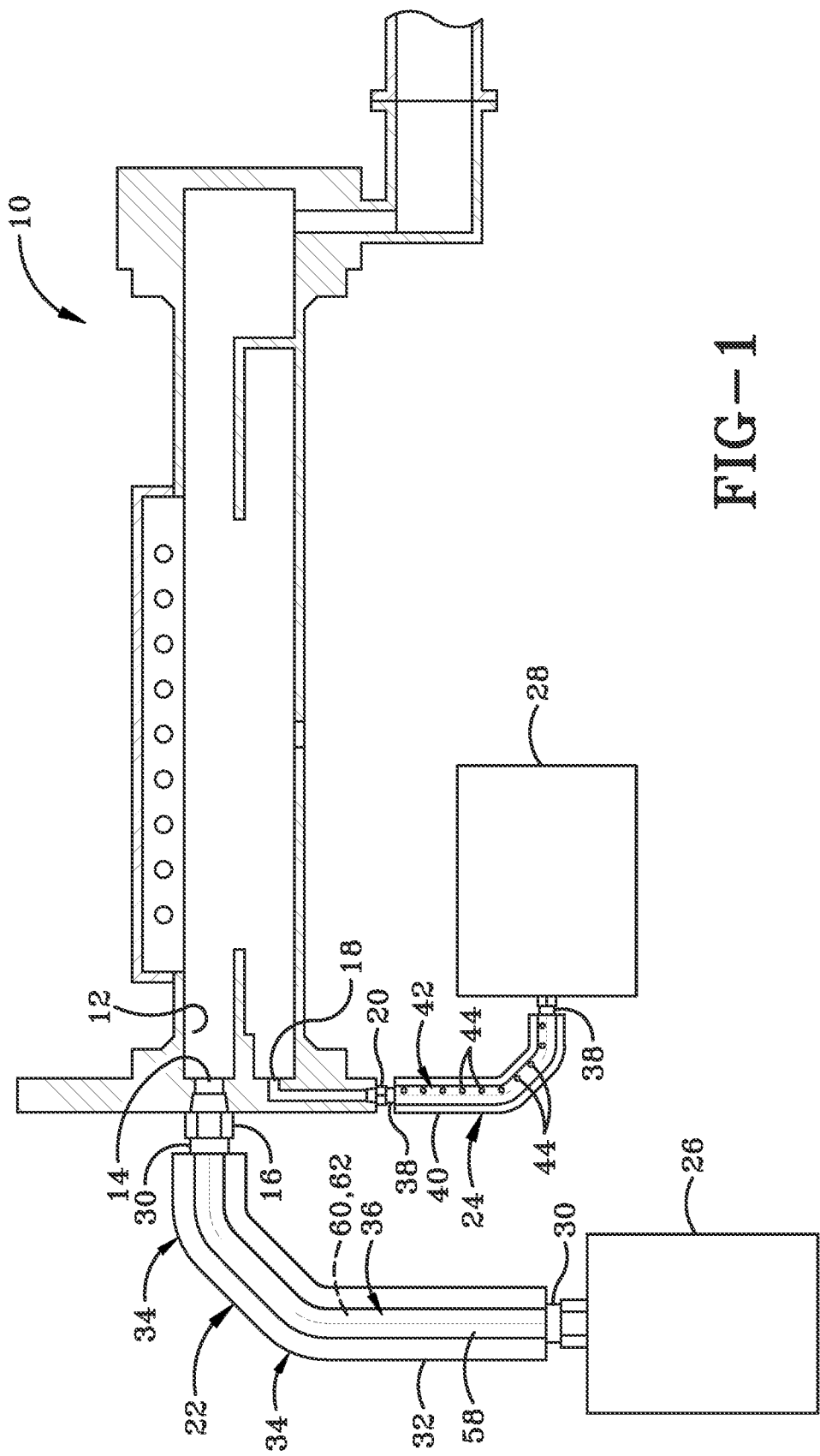
FIG. 1 schematically shows a cross-section of a semiconductor process module with fluid lines connecting the module and the source containers.

FIG. 1 illustrates a semiconductor reaction chamber 10 having a reaction space 12 therein. For brevity, the internals of the reaction space 12 have been simplified and/or removed and are not intended to be limiting. It should be readily apparent that any reaction space 12 or reaction chamber 10 may be utilized. Further, reaction space 12 may include a first inlet port 14 adapted to receive a microfitting or adapter 16 therein. A second inlet port 18 may also be formed in reaction chamber 10 and also include a microfitting or adapter 20 therein. While the exemplary embodiment only illustrates and describes two inlet ports in reaction chamber 10, any number of inlet ports are within the spirit and scope of the present disclosure.

A heater jacket 22 and a heater jacket 24 are each shown intermediate a precursor source 26 and a precursor source 28 respectively. Specifically, heater jacket 22 surrounds a fluid line 30 and heater jacket 22 may include an outer surface 32, one or more bends 34, and an attachment portion 36. In one implementation, attachment portion 36 may be a hook and loop fastener to permit easy installation and removal of heater jacket 22 from fluid line 30.

Heater jacket 24 is illustrated surrounding a fluid line 38 and heater jacket 24 also includes an outer surface 40 and an attachment portion 42 having a plurality of buttons or snaps 44 to secure the free ends at attachment portion 42. In the remaining FIGS, heater jacket 22 is described in greater detail. The only difference between heater jacket 22 and heater jacket 24 is the way in which the free ends are connected to one another to surround the appropriate fluid line. A person of ordinary skill in the art will immediately recognize that either closure mechanism, or a variety of suitable alternatives, may be utilized without departing from the spirit and scope of the disclosure. Further, while only two heater jackets are shown, any suitable number of heater jackets may be utilized, including multiple heater jackets for each fluid line.

Figure 2:
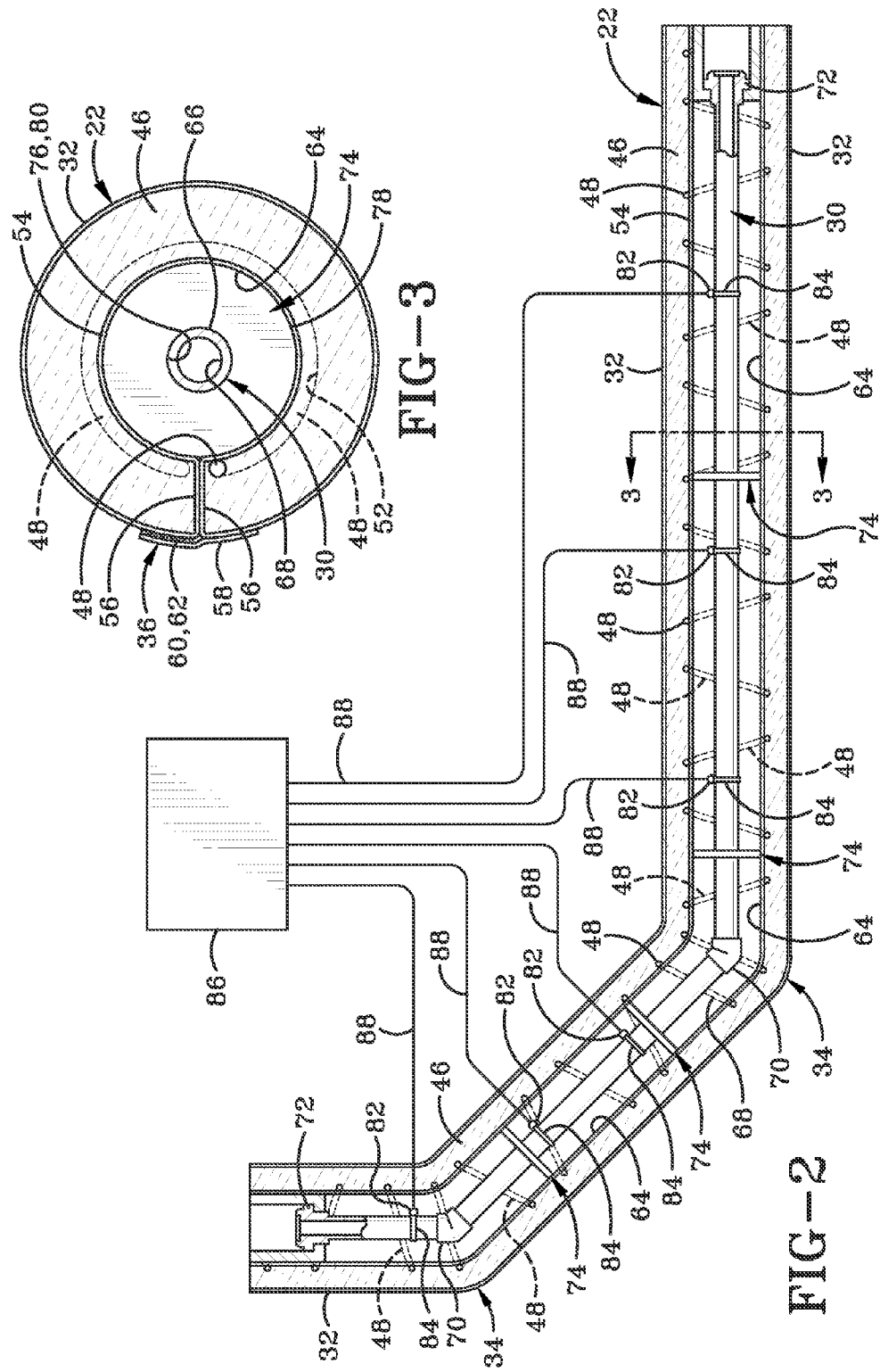
FIG. 2 is a longitudinal sectional view of a fluid line with a heater jacket.
Figure 3:
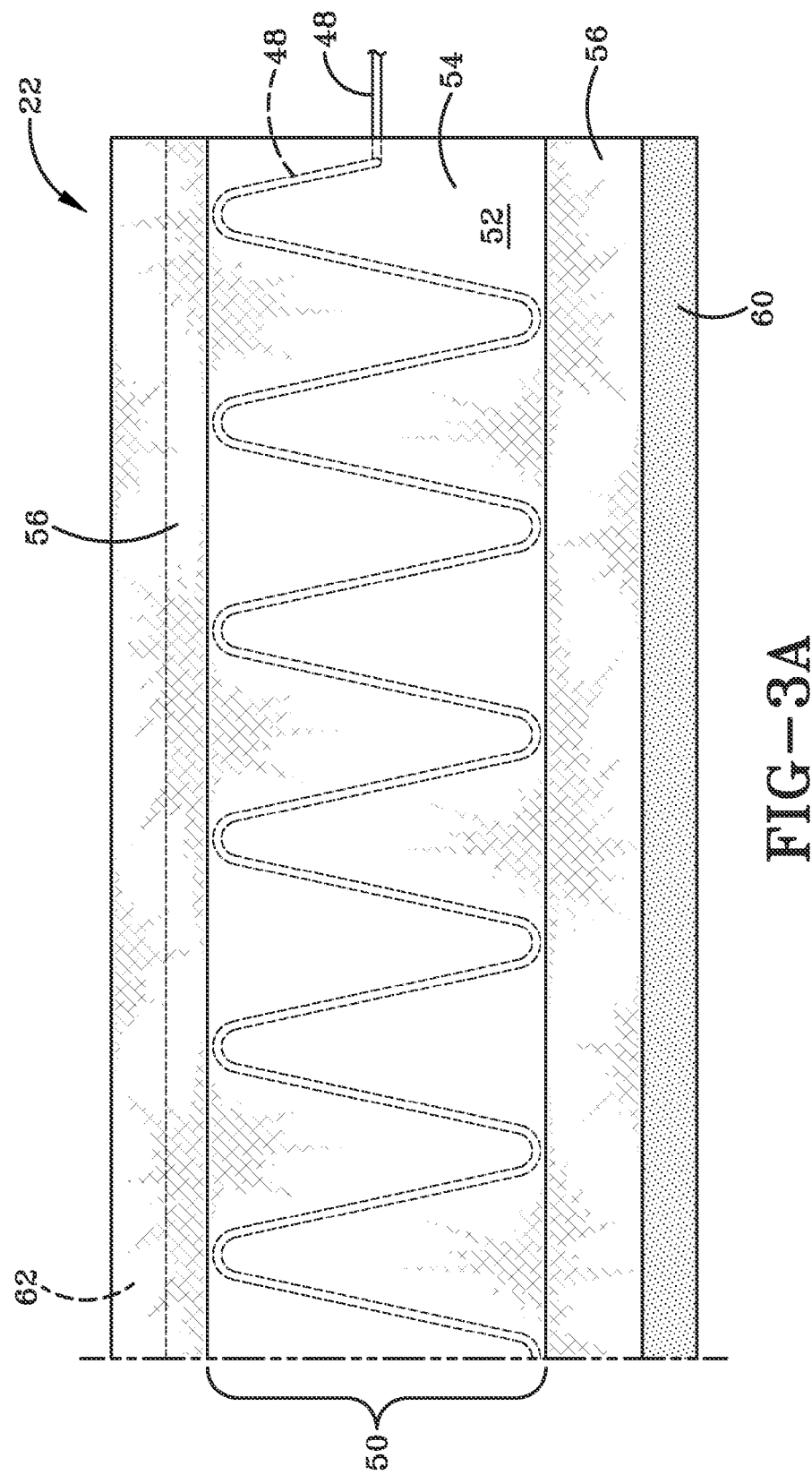
FIG. 3 is a sectional view of the fluid line and heater jacket taken generally about line 3-3 in FIG. 2.

Referring to FIGS. 2 and 3, heater jacket 22 and fluid line 30 are both illustrated in a longitudinal section view and a cross-sectional view, respectively. Heater jacket 22 may include an insulation material 46 attached to outer surface 32 to retain any heat generated by a heating element 48 within the heater jacket. Insulation material may be a silicone rubber, fiberglass, a flexible insulating material, or any suitable alternative. Heating element 48 may be a resistive wire heater, a ceramic heater, a band-type heater, or any other suitable heating method or apparatus. As illustrated in FIGS. 2 through 3A, heating element 48 may be located within heating area 50 of inner surface 52 and may be helically or spirally oriented by way of non-limiting example. Further, an inner protective layer 54 is secured against inner surface 52 to locate heating element 48 therein. In one aspect, heating element 48 may be partially recessed within insulation material 46 to promote a flush inner surface on heater jacket 22.

Outward of heating area 50 are free ends 56 which meet to secure fluid line 30 within heater jacket 22 during operation. As discussed previously, attachment point 36 secures free ends 56 together during operation. Attachment point 36 may be formed with a fixed end 58 secured to one of the free ends and a hook portion 60 extending from fixed end 58. A loop portion 62 may be attached to the other free end opposite fixed end 58 for receiving the hook portion 60 when securing fluid line 30 within the heater jacket.

As best seen in FIG. 2, protective layer 54 also at least partially defines an inner surface or inner cavity 64. Inner cavity 64 surrounds fluid line 30 and due to the gap between protective layer 54 and fluid line 30, heating element 48 is able to provide radiant or convection/oven style heating to the fluid line. Fluid line 30 also include an outer surface 66 and an inner surface 68, with inner surface 68 arranged to transport a fluid from precursor source 26 to reaction chamber 10. A plurality of microfittings 70 are disposed along the length of fluid line 30 and help the fluid line transition through bends. Still further, microfittings 72 may be used to connect two distinct pieces of a fluid line together.

Heater jacket 22 also includes a plurality of spacers 74 disposed within the heater jacket between protective layer 54 (an inner surface of the heater jacket) and fluid line 30. Advantageously, spacers 74 assist by providing a gap between protective layer 54 and fluid line outer surface 66. The gap or inner cavity 64, as discussed above, provides an air or gas filled medium for radiantly heating fluid line 30. In addition to providing inner cavity 64, spacers 74 also assist in preventing protective layer 54 from contacting fluid line 30. This provides a number of advantages including, but not limited to, preventing heat spikes or hot spots and preventing damage to the heater jacket caused by friction from the fluid line rubbing against the inner surface of the heater jacket. Each spacer 74 includes an inner surface 76 generally adjacent fluid line 30 and an outer surface 78 generally adjacent protective layer 54. Inner surface 76 defines a hole 80 for receiving fluid line 30. In one aspect, hole 80 is sized slightly larger than fluid line outer surface 68 so that spacer 74 can easily slide into position on fluid line 30, but is small enough that it will not move too easily.

Fluid line 30 may be any suitable tube capable of transporting a chemical from the source container to the reaction chamber. Typical fluid lines may have an outside diameter of ¼" to ⅜", although any size fluid line is within the spirit and scope of the disclosure, including fluid lines having an OD greater than 1". When a ¼" OD fluid line is being utilized, spacers 74 may be any suitable size, such as 18.5 mm OD with a thickness of 0.25mm to 3mm and preferably 1 mm thick. Nevertheless, the OD of spacer 74 may easily range from 7 mm to 50 mm or larger. When enclosing a ⅜" OD fluid line, the sizes and ranges of the spacer 74 OD would increase substantially.

In one aspect, spacers 74 are strategically placed on both sides of each microfitting to guarantee that the heater jacket does not touch fluid line 30 at the microfitting or on either side of the microfitting. Further, spacers 74 may be spaced apart strategically to selectively heat certain portions of the fluid line more efficiently. For example, fluid flow in bends or at microfittings may create some turbulent flow and restrict proper fluid flow. In this instance it may be important to increase the temperature by 10-50 degrees C. in those areas.

By locating spacers on each side of the affected area, the heating element in the affected area can be raised to a higher temperature to prevent condensation and promote more efficient fluid flow. On the other hand, the adjacent zones (as defined by each set of spacers 74) may be maintained as the appropriate temperatures to guarantee that the particular fluid within fluid line 30 remains at a temperature above the condensation range regardless of the fluid's location within fluid line 30.

The temperature ranges may be from as low as room temperature to upwards of 800 degrees C. depending on the materials being transmitted through the fluid line and the material used to encapsulate the heater elements within the heater jacket. In one aspect, the preferred maximum temperature is 200 degrees C. Further, the temperature range is ideally controlled within a +/−10 degree C. range and even more preferably a +/−5 degree C. range.

FIG. 2 also illustrates a plurality of thermocouples 82 mounted to fluid line 30 with clamps 84 to measure the temperature of fluid line 30 directly. Thermocouples 82 may each include a single function of being a control temperature thermocouple 82 or an over-temperature thermocouple 82. Regardless of which function each thermocouple 82 performs, each thermocouple 82 is connected to a monitoring unit 86 through outputs 88. In one aspect, the thermocouple may perform both the control temperature function and the over-temperature function, or two separate thermocouples may be mounted at the same clamp 84 to provide both readings. In one implementation, a control temperature thermocouple 82 and an over-temperature thermocouple 82 may each be located between a pair of spacers 74 to properly maintain the temperature within that particular zone or region. Providing separate thermocouples 82 for each zone may be necessary if each zone is maintained at different temperatures or even if all the zones are set to the same temperature to ensure continuity in the temperature throughout the fluid line. Although not specifically shown in the FIGS, each thermocouple output 88 must extend through an opening in the heater jacket. These openings may be sealed or sleeved to prevent any temperature lose to the ambient air.

Figure 4:
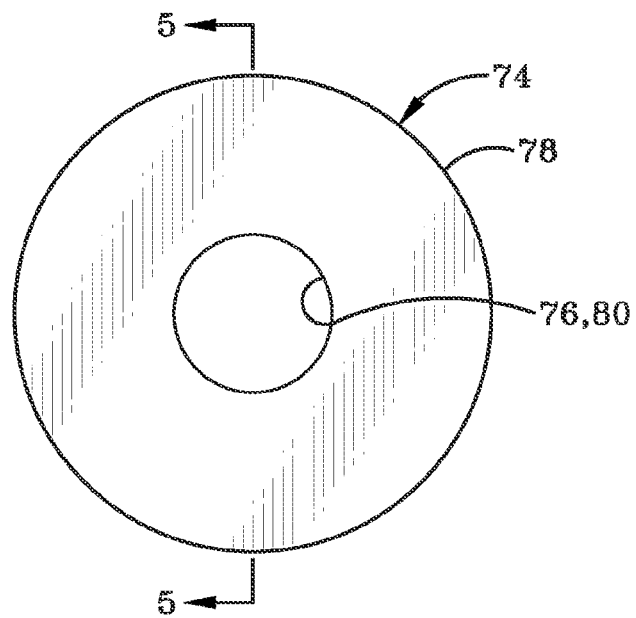
FIG. 4 is a front view of a fluid line spacer.
Figure 5:
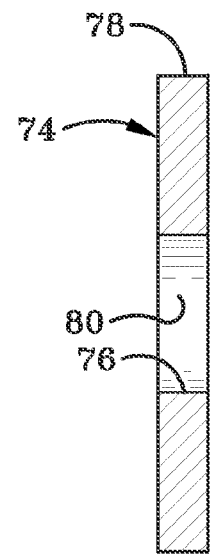
FIG. 5 is a sectional view of a fluid line spacer taken generally about line 5-5 in FIG. 4.
Figure 6:
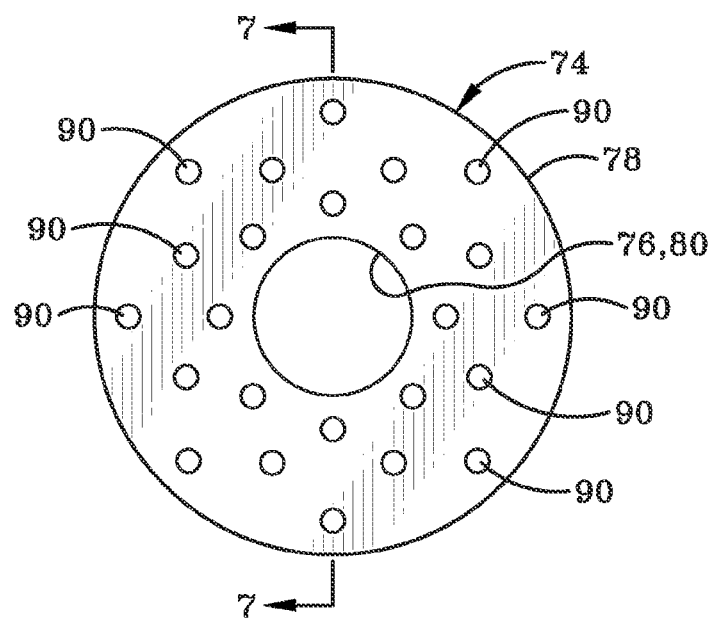
FIG. 6 is a front view of a fluid line spacer.
Figure 7:
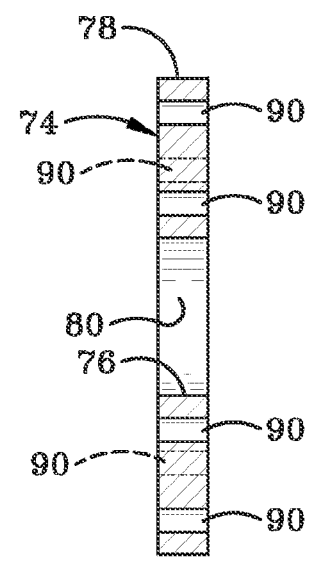
FIG. 7 is a sectional view of a fluid line spacer taken generally about line 7-7 in FIG. 6.

FIGS. 4 through 7 illustrate two non-limiting examples of spacers 74 which may include a radius or rounded portion on each edge to prevent damage to the inner surface of the heater jacket. Specifically, FIGS. 4 and 5 illustrate a solid spacer 74, while FIGS. 6 and 7 illustrate a spacer 74 having a plurality of apertures 90 therein.

Solid spacer 74 shown in FIGS. 4 and 5 may be used in applications where the desired temperature control regime is identical throughout the length of the fluid line or in applications where the temperature changes at each zone or between each spacer. As can be seen, spacer 74 is solid between inner surface 76 and outer surface 78 and includes spacer hole 80 therein. In one implementation, spacer 74 may be composed of stainless steel with approximately a 1 mm thickness and an outside diameter of approximately 18.5 mm. Spacer 74 may also be composed of any number of alternative materials, including but not limited to, plastics, aluminum, or any other suitable material.

Similarly, spacer 74 with apertures 90 may be used in applications where the desired temperature control regime is identical throughout the length of the fluid line or in applications where the temperature changes at each zone. Advantageously, apertures 90 may be used to permit continuity between zones and particularly at each area directly adjacent the spacer since heated air may be able to pass through apertures 90. Still further, the shape and size of apertures 90 is not limited to circles or those shown in FIGS. 6 and 7, but may instead be any shape or size suitable for the application. For example, the size of apertures 90 may be restricted to reduce the amount of heated air passing there through on one end of a zone, while the apertures on the opposite spacer may be large to permit additional heated air flow. As can be seen, a number of modifications are within the spirit and scope of the disclosure without significant modifications.

In addition, a variety of spacers 74 may be used in a single fluid line heater jacket. By way of non-limiting example, a heater jacket may utilize solid spacers 74 on each end of the microfittings and spacers 74 with apertures during straight sections of the fluid line or vice versa.

Spacers 74 may also be include multiple pieces attached together to form a single spacer. For example, spacer 74 may be two half pieces which through holes in one half and threaded holes in the opposite half so that an attachment bolt can be directed through the through holes and screwed into the threaded holes. Advantageously, this arrangement would simply installation, allow retrofitting of old fluid lines with the spacer heater jacket system without disconnecting the fluid lines, and thereby reduce overall expenses for the heater jackets. While a through hole with threaded holes is one means to secure two spacer halves, a locking clip, adhesive, welding, solder, or any other attachment means may be utilized.

Heater jacket 22 also provides an easier and simpler method to control the temperature of the fluid line. Prior to securing heater jacket 22 around fluid line 30, the appropriate spacers 74 (either being solid, having apertures, or a combination of both) may be located on fluid line 30. The heater jacket is then secured around fluid line 30 and spacers 74 and fastened at attachment portion 76 using hook portion 60 and loop portion 62. After securing the appropriate outputs 88 from the various thermocouples 82 to monitoring unit 86, heating element 48 is powered to the appropriate temperature to heat the air gap between the protective layer 54 and fluid line 30 to heat the fluid therein by radiant heating or convection heating. The thermocouples then provide data on both the control temperature and the over-temperature to the monitoring unit, where the monitoring unit is then capable of increasing or decreasing the power to heating element 48 as appropriate.

While the present disclosure merely illustrates a single heating element in a single heater jacket for a fluid line, it is within the spirit and scope of the disclosure to incorporate multiple separate heating elements within a single heater jacket. By way of non-limiting example, a separate and distinct heating element may be incorporated at each and every heating zone to more accurately control the various temperatures in the fluid line, regardless if different temperatures are required in different zones.

In one aspect, the precursors or fluids transported within the fluid line may be TEMAH, TBTDET, $TaCl_5$ $H_2O$. TEMAH is a specific example with a service temperature of approximately 90 degrees C. and a decomposition temperature of approximately 100 degrees C. If any portion of the fluid line in less than 90 degrees C., condensation forms and if any fluid line is greater than 100 degrees C., decomposition occurs. Thus it is seen that precise control of the fluid line is highly desired.

These and other embodiments for methods of using and apparatus for heater jackets for a fluid line may incorporate concepts, embodiments, and configurations as described with respect to embodiments of apparatus for susceptors described above. The particular implementations shown and described are illustrative of the invention and its best mode and are not intended to otherwise limit the scope of the aspects and implementations in any way. Indeed, for the sake of brevity, conventional manufacturing, connection, preparation, and other functional aspects of the system may not be described in detail. Furthermore, the connecting lines shown in the various figures are intended to represent exemplary functional relationships and/or physical couplings between the various elements. Many alternative or additional functional relationship or physical connections may be present in the practical system, and/or may be absent in some embodiments.

As used herein, the terms "comprises", "comprising", or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

What is claimed is:

1. A heater jacket for a fluid line comprising:
   a tube having an inner surface, an outer surface and an attachment mechanism to permit installation and removal of the tube from a fluid line by attaching free ends of the heater jacket together;
   a heating element between the inner surface and the outer surface;
   a spacer disposed within the tube between the inner surface and the fluid line configured to define a cavity between the inner surface and the fluid line, said cavity configured to allow radiant heat from the heating element to heat fluid within the fluid line and to prevent the heater jacket contacting the fluid line; and
   wherein the spacer includes a hole for receiving the fluid line therein and spaces the fluid line from the tube inner surface, and
   wherein the fluid line is configured to transport a fluid from a precursor source to a reaction chamber.

2. The heater jacket of claim 1 wherein the inner surface further comprises a recess.

3. The heater jacket of claim 2 wherein the heating element is disposed within the recess.

4. The heater jacket of claim 2 wherein the heating element provides convective heating to the fluid line.

5. The heater jacket of claim 2 wherein the recess is spirally disposed within the inner surface.

6. The heater jacket of claim 1 wherein the spacer further comprises an outer surface in contact with the tube inner surface.

7. The heater jacket of claim 6 wherein the spacer is solid between the spacer hole and the spacer outer surface.

8. The heater jacket of claim 6 wherein the spacer further comprises a plurality of apertures between the spacer hole and the spacer outer surface to facilitate convective heating of the fluid line.

9. The heater jacket of claim 8 wherein the plurality of apertures are pores.

10. The heater jacket of claim 1 further comprising a plurality of spacers disposed along a length of the fluid line.

11. The heater jacket of claim 10 wherein a fluid line temperature between each spacer is approximately the same throughout the length of the fluid line.

12. The heater jacket of claim 10 wherein the heater jacket heats portions of the fluid line based on the placement of the spacers.

13. The heater jacket of claim 10 wherein the fluid line further comprises a bend and one of the plurality of spacers is located on each side of the bend.

14. The heater jacket of claim 1 wherein the fluid line has an outside diameter of ¼ inch to ⅜ inch.

15. The heater jacket of claim 13 wherein the tube inner surface does not contact the bend.

16. The heater jacket of claim 1, wherein the heater jacket comprises one or more spacers that are solid between the spacer hole and the spacer outer surface and one or more spacers that comprise apertures between the spacer hole and the spacer outer surface.

17. A reaction system comprising:
    a reaction chamber fluidly connected to a fluid line;
    a precursor source fluidly coupled to the fluid line;
    a heater jacket for the fluid line, the heater jacket comprising a tube having an inner surface, an outer surface and an attachment mechanism to permit installation and removal of the heater jacket from the fluid line by attaching free ends of the heater jacket together, a spacer disposed within the tube between the inner surface and the fluid line configured to prevent the heater jacket from contacting the fluid line, said cavity configured and to define a cavity between the inner surface and the fluid line, said cavity configured to allow radiant heating by the heating element of the fluid line, and a heating element between the inner surface and the outer surface; and
    wherein the spacer includes a hole for receiving the fluid line and spaces the fluid line from the tube inner surface.

18. The reaction system of claim 17 further comprising a plurality of spacers, wherein the tube inner surface contacts the plurality of spacers and does not contact the fluid line.

19. The reaction system of claim 17 wherein the tube comprises an inner wall comprising the inner surface and wherein the heating element is embedded in the tube inner wall and provides radiant heat to the fluid line.

20. The reaction system of claim 17 wherein the spacer is solid between the spacer hole and a spacer outer surface.

21. The reaction system of claim 17 wherein the spacer further comprises a plurality of apertures between the hole and a spacer outer surface.

22. The reaction system of claim 17 wherein the spacer further comprises a first half having a pair of through holes and a second half having a pair of threaded holes; and
    wherein a pair of screws are inserted through the first half through holes and screwed into the second half threaded holes to mount the spacer on the fluid line.

23. The reaction system of claim 17 wherein the heating element is embedded in the tube inner wall and provides convection heating to the fluid line.

24. A method of maintaining a fluid temperature in a semiconductor processing machine comprising the steps of:
    providing a reaction chamber in communication with a fluid line and a heater jacket surrounding at least a portion of the fluid line, wherein the heater jacket comprises a tube having an inner surface, an outer surface, a heating element, and an attachment mechanism to permit installation and removal of the heater jacket from the fluid line by attaching free ends of the heater jacket together, a spacer disposed within the tube between the inner surface and the fluid line to define a cavity between the inner surface and the fluid line to allow radiant heat from the heating element to radiantly heat the fluid line and to prevent the heating element from contacting the fluid line; and wherein the spacer includes a hole for receiving the fluid line and spaces the fluid line from the tube inner surface;

powering the heating element to increase a temperature of a fluid between the fluid line and the tube;

monitoring a temperature of the fluid line using a thermocouple mounted to the fluid line; and, controlling the temperature of the fluid between the fluid line and the tube in response to monitoring the temperature of the fluid line.

\* \* \* \* \*